Inventor
Louis D. Holmes
By Fred Gerlach
atty

Aug. 30, 1949.                    L. D. HOLMES                    2,480,735
        CAR WASHING APPARATUS WITH PNEUMATIC BRUSH ACTUATING
            MEANS AND GRAVITY OPERATED BRUSH RETRACTING MEANS
Filed Feb. 19, 1945                                    5 Sheets-Sheet 2
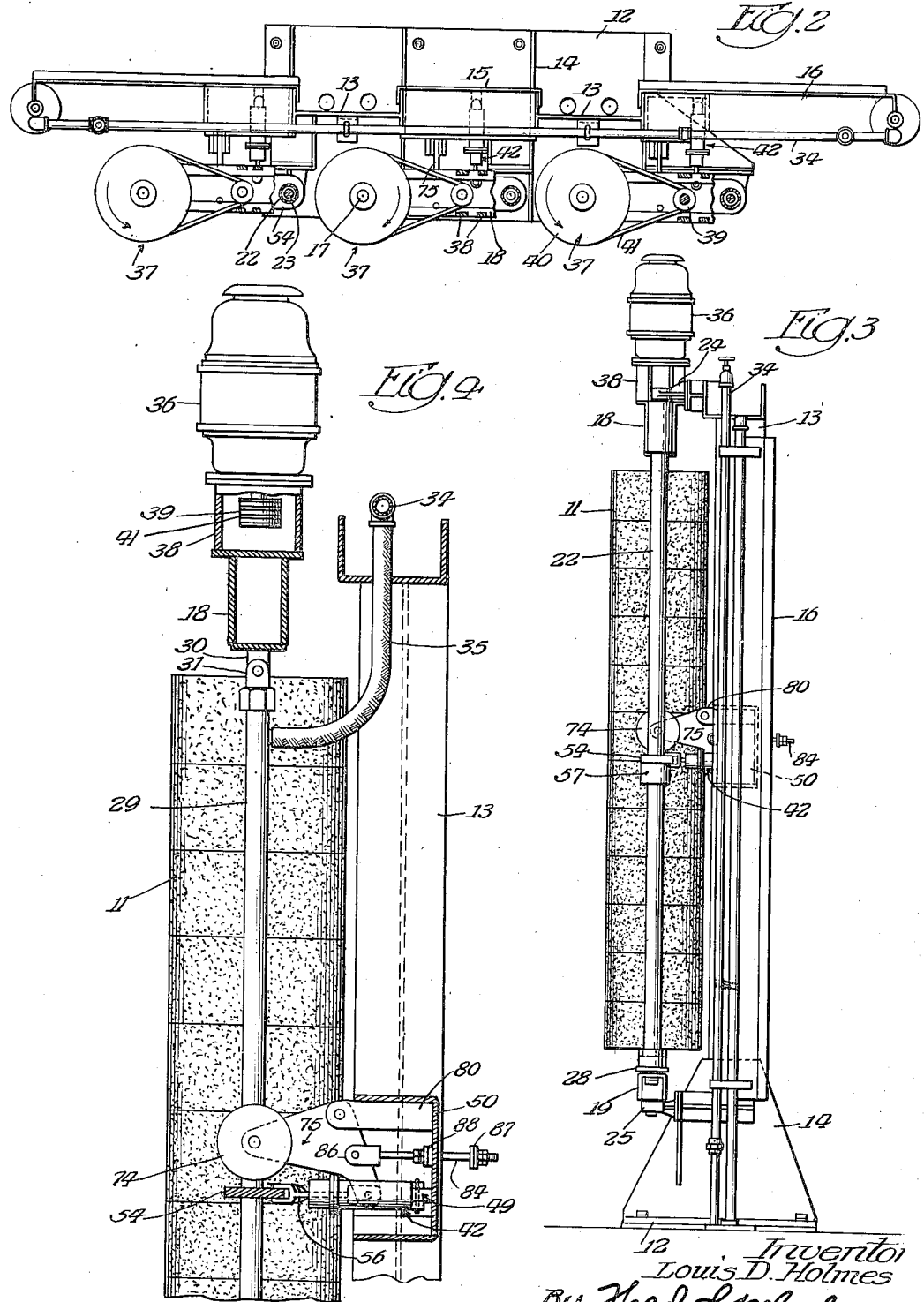
Inventor
Louis D. Holmes
By Fred Gerlach atty.

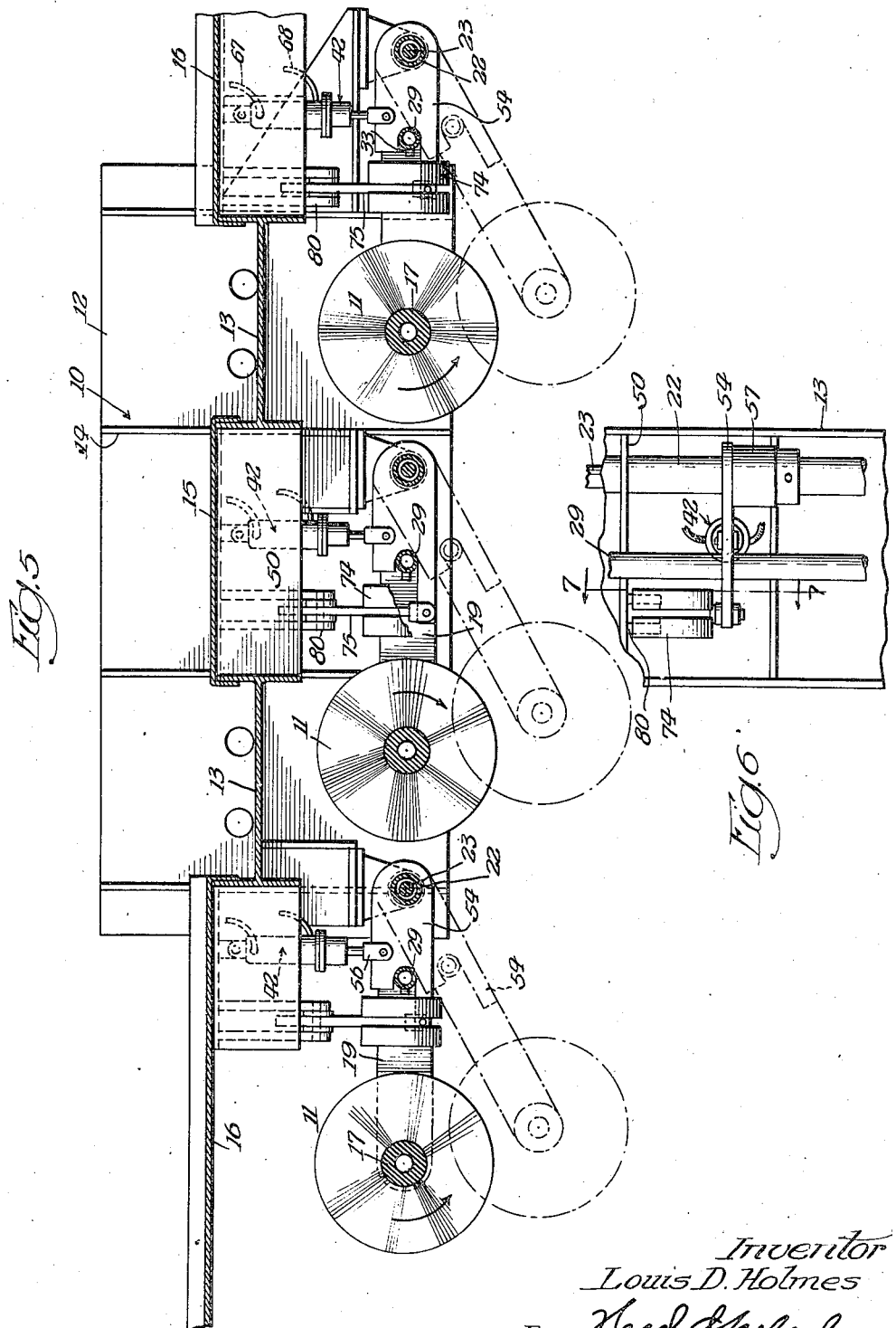

Aug. 30, 1949.   L. D. HOLMES   2,480,735
CAR WASHING APPARATUS WITH PNEUMATIC BRUSH ACTUATING
MEANS AND GRAVITY OPERATED BRUSH RETRACTING MEANS
Filed Feb. 19, 1945   5 Sheets-Sheet 4
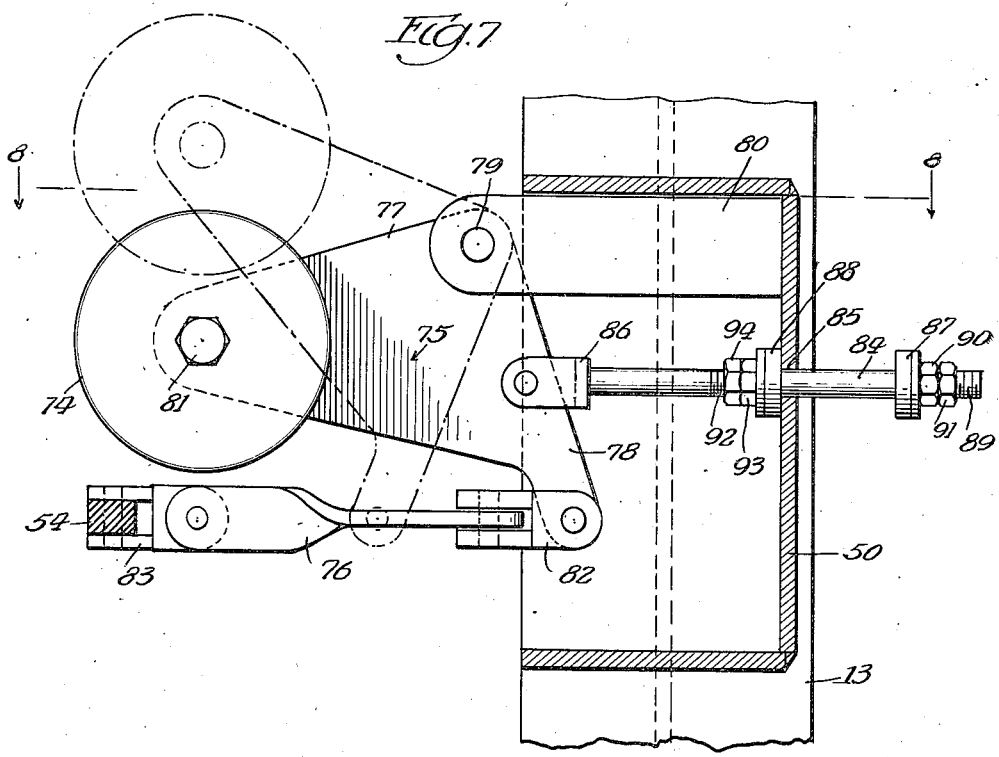
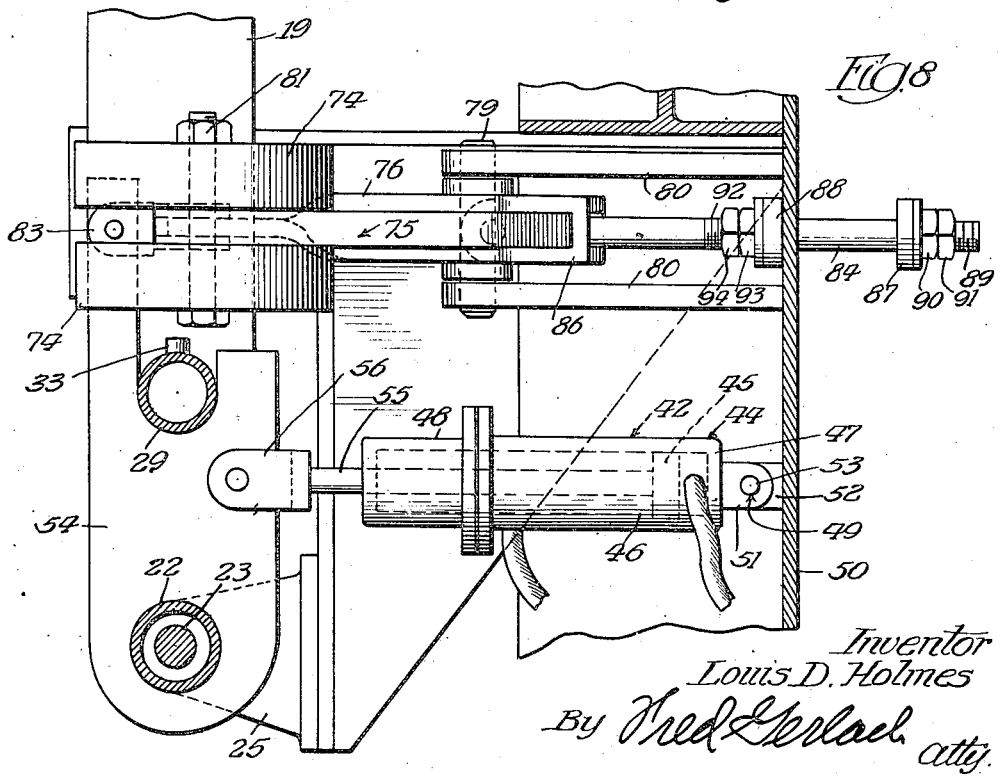
Inventor
Louis D. Holmes
By Fred Gerlach, atty.

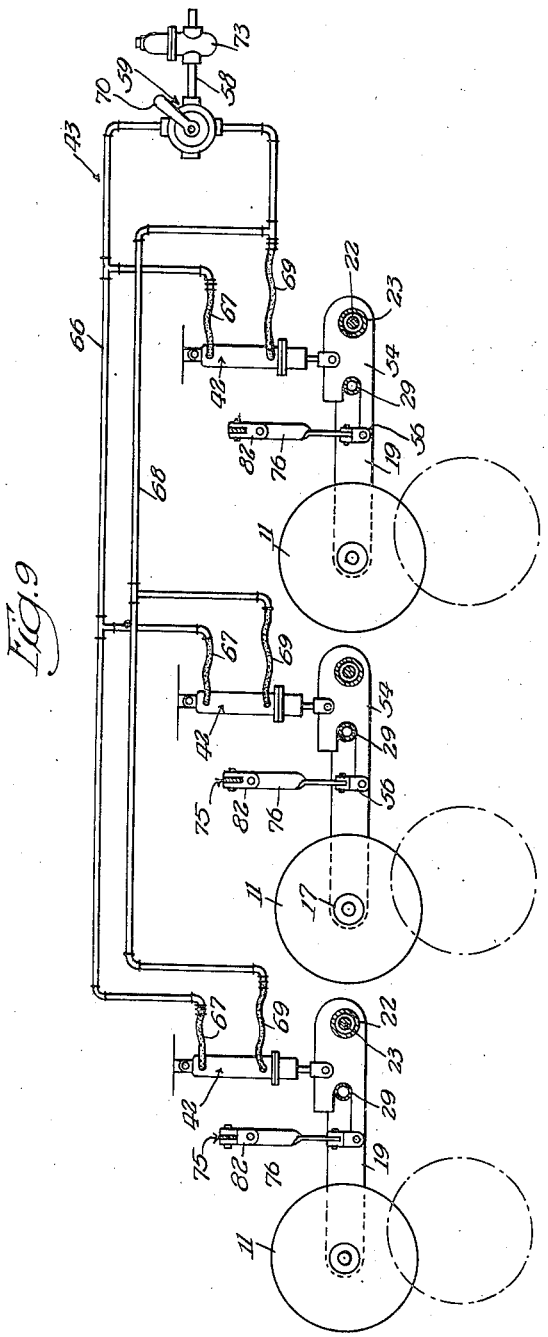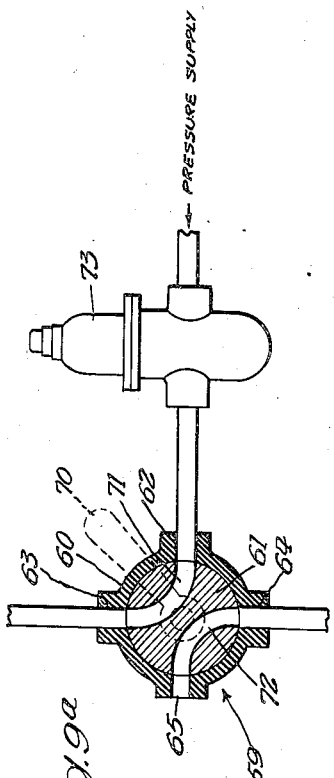

Patented Aug. 30, 1949

2,480,735

UNITED STATES PATENT OFFICE 2,480,735

CAR WASHING APPARATUS WITH PNEUMATIC BRUSH ACTUATING MEANS AND GRAVITY OPERATED BRUSH RETRACTING MEANS

Louis D. Holmes, Blue Island, Ill., assignor to Whiting Corporation, Harvey, Ill., a corporation of Illinois Application February 19, 1945, Serial No. 578,672

7 Claims. (Cl. 15—53)

1

The present invention relates generally to apparatus for washing railroad cars and other vehicles. More particularly the invention relates to that type of car washing apparatus which is positioned at one side of the track or runway for the car to be washed, serves to wash the adjacent side of the car as the car is propelled in one direction past the apparatus, and as its component parts comprises an upstanding supporting structure and a series of rotary substantially vertical power driven brushes which are pivotally supported on the structure to swing laterally to and from an operative or washing position wherein they engage the adjacent car side.

One object of the invention is to provide a car washing apparatus of this type which is an improvement upon, and has certain inherent advantages over, previously designed apparatus and is characterized by the fact that it embodies pneumatic means for swinging the brushes into their washing position and such means is in the form of a plurality of piston and cylinder devices which are associated with the brushes respectively and are rendered operative by a valve controlled air system.

Another object of the invention is to provide a car washing apparatus of the last mentioned character in which the valve controlled air system constituting part of the pneumatic means for swinging the brushes is so arranged and designed that it may be utilized to retract the brushes from their washing position as well as shift the brushes into their operative or washing position and includes a single two-position control valve which when shifted into one position results in the piston and cylinder devices conjointly shifting the brushes into their operative or washing position and when shifted into its other position results in conjoint retraction of the brushes.

Another object of the invention is to provide in connection with a car washing apparatus of the type and character under consideration counterweights which are associated with the brushes respectively and are so arranged and constructed that they operate automatically to retract the brushes in the event there is a failure of the supply of air to the piston and cylinder devices when the control valve is shifted into its said other position.

A further object of the invention is the provision of simple and novel adjustable means whereby swinging of the brushes into their operative or washing position is so limited as to provide the proper amount of brush bristle contact with the car side for most effective washing results and

2 the brushes, after propulsion of the car therepast, are prevented from swinging to such an extent that when contacted by the next following car to be washed they are caused so to bounce as to preclude an efficient washing of the front end of the next following car.

A still further object of the invention is to provide a car washing apparatus which effectively and efficiently fulfills its intended purpose, embodies a novel and compact arrangement of parts and is capable of being produced and operated at a comparatively low cost.

Other objects of the invention and the various advantages and characteristics of the present car washing apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 2 is a plan view of the apparatus, the brush driving motors being omitted for clarity of illustration;

Figure 3 is an end elevation of the apparatus;

Figure 4 is an enlarged vertical transverse section taken on the line 4—4 of Figure 1 and illustrating in detail the construction, arrangement and design of the piston and cylinder devices for swinging the rotary brushes back and forth between their washing and retracted positions and the counterweights for urging the brushes into their retracted position;

Figure 5 is an enlarged horizontal section taken on the line 5—5 of Figure 1;

Figure 6 is an enlarged fragmentary front view of the apparatus, showing the manner in which the piston and cylinder devices and the counterweights are operatively connected to the brushes;

Figure 7 is an enlarged vertical transverse section on the line 7—7 of Figure 6;

Figure 8 is a horizontal section on the line 8—8 of Figure 7;

Figure 9 is a diagrammatic view of the piston and cylinder devices and the valve controlled air system which together constitute the pneumatic means for actuating or swinging the rotary power driven brushes; and Figure 9a is a cross section of the single 2-position control valve of the air system.

Figure 1:
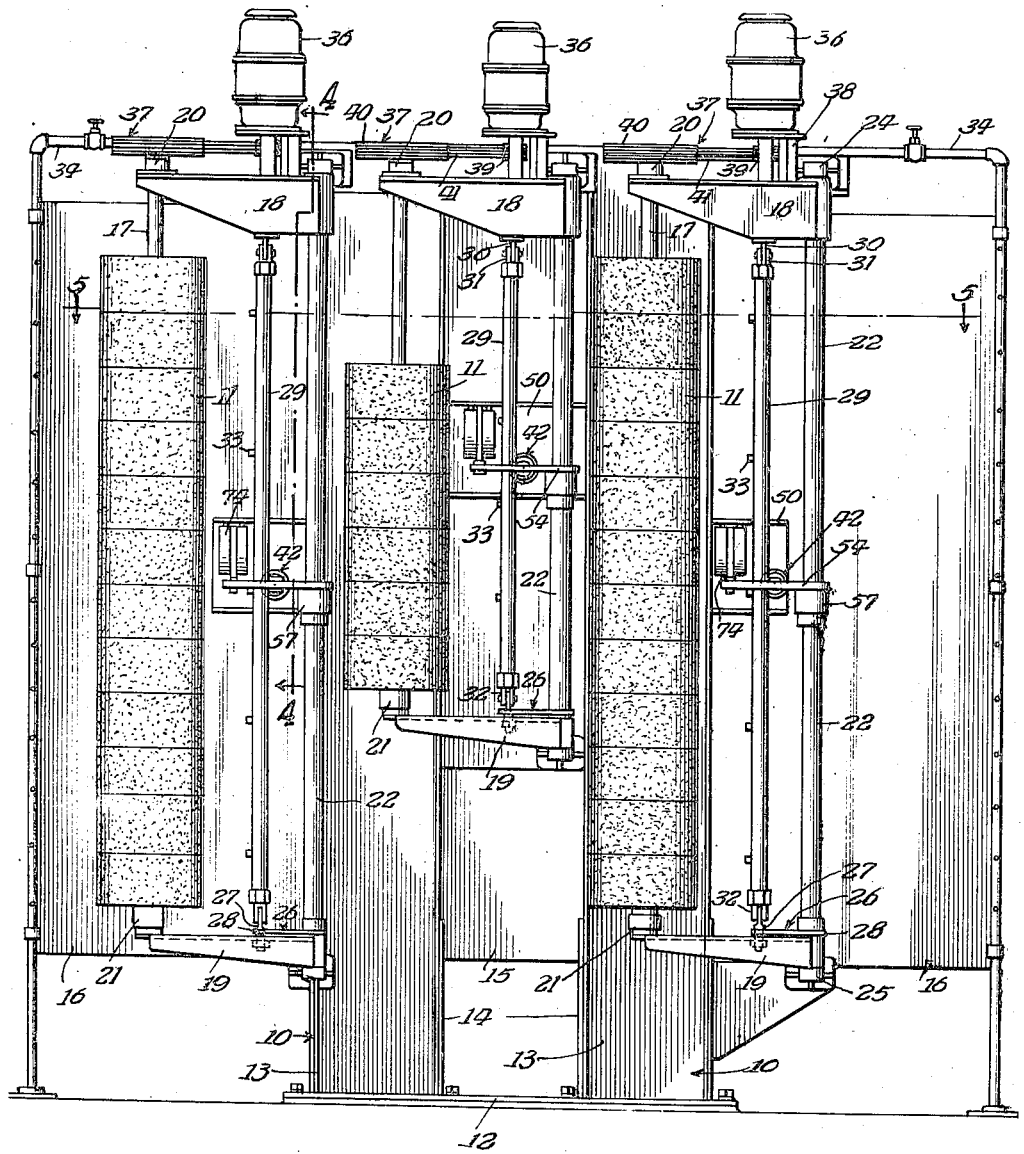
Figure 1 is a front elevation of a car washing apparatus embodying the invention, showing in detail the manner in which the rotary power driven brushes are pivotally supported on the supporting structure so as to swing laterally to and from their operative position.

The washing apparatus which is shown in the drawings constitutes the preferred form or embodiment of the invention. It is primarily adapted for use in washing a railroad car (not shown) while the latter, together with the following cars, is propelled past the apparatus. It is contemplated that the apparatus will be positioned on one side of the track or runway (also not shown) for the cars to be washed and also that the apparatus will be used in conjunction with a complemental apparatus on the other side of the track or runway to the end that the two apparatuses in connection with use thereof will wash both sides of the cars. As certain of its parts the car washing apparatus comprises an upstanding supporting structure 10 and three rotary substantially vertical brushes 11.

The supporting structure 10 rests on, and is anchored to, the foundation at one side of the track and embodies a horizontal base plate 12 and a pair of laterally spaced vertically extending I-beams 13. The I-beams are so arranged that the webs thereof are coplanar and extend in parallel relation with the car track. The lower ends of the I-beams 13 rest on the base plate 12 and are secured thereto by transversely extending plates 14 which are welded to the lower ends of the I-beam flanges and are welded or otherwise fixedly secured to the base plate 12. In addition to the base plate and I-beams the supporting structure 10 embodies a vertically extending channel beam 15 and a pair of vertically extending side plates 16. The channel beam 15 extends between the I-beams 13 and the flanges thereof project forwards and are arranged in lapped and welded relation with the inner flanges of the two I-beams. The side plates 16 project outwards in opposite directions from the I-beams and have along the inner side margins thereof forwardly extending flanges which are arranged in lapped relation with, and are welded to, the outer flanges of the I-beams 13. The supporting structure 10 is essentially of unitary design or construction and assists in supporting the brushes 11.

The brushes 11 are positioned in front of the supporting structure 10 and each comprises a vertical series of bristle equipped split hubs. When the brushes are in their retracted position and viewed as in Figures 1 and 2 the right hand brush is positioned in front of the right-hand I-beam 13, the intermediate brush is positioned in front of the left-hand I-beam and the left-hand brush is positioned in front of the left-hand side plate 16. As hereinafter described more in detail, the brushes are pivotally supported so as to swing forwards from their retracted position into a washing or operative position and are adapted when in their washing position to effect washing of the adjacent car side. The right and left hand brushes are of such height that in connection with a washing operation they serve to wash all portions of the adjacent car side. The intermediate brush is of materially less height and is so positioned and of such height as to wash the adjacent windows of the car being washed. The bristle equipped split hubs which form or constitute the brushes surround and are clamped about substantially vertical shafts 17. These shafts are driven as hereinafter described in order to effect rotation or drive of the brushes 11 in connection with a washing operation. The brushes are pivotally supported on the structure 10 to swing laterally back and forth between their washing and retracted positions by means of horizontally extending upper arms 18 and horizontally extending lower arms 19. The upper ends of the shafts 17 extend through bearings 20 in the distal ends of the upper arms 18 and the lower ends of the shafts 17 are journalled in bearings 21 on the distal ends of the lower arms 19. The upper and lower arms 18 and 19 extend or project in the direction of movement of the car being washed. The pivotal supporting means for the brushes comprises in addition to the upper and lower arms, vertically extending tubes 22 and shafts 23 within the tubes. The shafts 23 are positioned within the tubes 22 and are so arranged that the upper ends thereof project above the upper ends of the tubes and their lower ends project beneath the lower ends of the tubes. The shafts 23 are stationary and have the upper ends thereof connected to brackets 24 on the supporting structure and their lower ends connected to brackets 25 on said supporting structure. The tubes 22 are rotatable relatively to the shafts 23. The proximal ends of the upper arms 18 surround, and are fixedly connected to the upper ends of, the tubes 22 and the proximal ends of the lower arms 19 extend loosely around the lower ends of the shafts 23 in order that the lower arms are rotatable relatively to the shafts. The lower arms 19 are connected to the lower ends of the tubes 22 by lost motion connections 26 in order that they are operatively connected to the upper ends of the upper arms through the medium of the tubes while at the same time they are permitted to swing laterally relatively to the upper arms. The lost motion connections 26 are like those disclosed in United States patent application Serial No. 496,879 filed by me on July 31, 1943, and now Patent No. 2,381,054, dated August 7, 1945, and comprise vertically extending lugs 27 and horizontally extending arms 28. The lugs 27, as shown in Figure 1 of the drawings, are connected to, and project upwards from, the central portions of the lower arms 19. The arms 28 are fixedly connected to, and project radially from, the lower ends of the tubes 22 and have forked outer ends in straddled relation with the lugs 27. By employing the lost motion connections 26 the brushes 11 are permitted to tilt laterally to a limited extent and hence when in their washing position are capable of adapting themselves to the adjacent car side even though the latter is tilted with respect to a vertical plane.

In addition to the parts heretofore described the car washing apparatus comprises spray pipes 29 for spraying water or a chemical washing solution onto the brushes 11. These pipes are three in number and extend vertically. They are associated with the brushes respectively and are positioned between the brushes and the tubes 22. The upper ends of the spray pipes 29 are pivotally connected to depending lugs 30 on the central portions of the upper arms 18 by way of clevices 31 and the lower ends of the spray pipes are pivotally connected to the upper ends of the lugs 27 by clevices 32. The clevices 31 and 32 permit the spray pipes to tilt laterally in conformity with the brushes 11. The spray pipes 29 have laterally extending nozzles 33 and are supplied with water or a chemical washing solution under pressure by way of a horizontally extending feed pipe 34. As shown in Figure 1, the nozzles 33 project in the direction of the brushes 11. The feed pipe 34 extends across the upper end of the supporting structure 10 and is connected to the upper ends of the spray pipes 29 by way of hoses 35.

The rotary brushes 11 are driven in connection with a car washing operation by means of electric motors 36 and pulley and belt connections 37. The motors 36 overlie, and are connected by brackets 38 to, the inner or proximal ends of the horizontally extending upper arms 18 and are arranged so that the armature shafts thereof extend vertically. The pulley and belt connections 37 consists of pulleys 39 on the lower ends of the armature shafts of the motors 36, pulleys 40 on the upper ends of the brush shafts 17 and belts 41 around the pulleys 39 and 40. When the motors 36 are in operation they operate through the medium of the pulley and belt connections 37 and the shafts 17 to rotate or drive the brushes 11. It is contemplated that the brushes will only be driven when they are swung outwards into their washing position wherein the bristles thereof are in contact with the adjacent car side.

The brushes 11 are swung conjointly into and out of their washing or operative position by pneumatic means in the form of piston and cylinder devices 42 and a valve controlled air system 43. The piston and cylinder devices 42 are three in number and, as shown in Figures 1, 2 and 5 of the drawings, are associated with the brushes 11, respectively. They are positioned horizontally, extend at right angles to the supporting structure 10 and are located adjacent to central portions of the tubes 22 and the spray pipes 29. As best shown in Figure 8 the devices 42 comprise cylinders 44 and pistons 45. The cylinders 44 embody cylindrical side walls 46 and these have integral crosswalls 47 at the inner ends thereof and removable heads 48 at the outer ends thereof. The devices 42 are supported to swing horizontally by means of pivotal connections 49 which extend between the crosswalls 47 of the cylinders 44 and brackets 50 on the supporting structure 10. As shown in Figure 8 the pivotal connections 49 comprise externally disposed rearwardly extending pivot lugs 51 on the central portions of the cylinder crosswalls 47 and forwardly projecting pivot lugs 52 on the brackets 50, and, in addition, vertically extending pivot pins 53 which extend through aligned holes in the lugs 51 and 52. The pistons 45 of the devices 42 are mounted in the cylinders 44 to slide back and forth between the crosswalls 47 and the cylinder heads 48 are operatively connected to horizontally extending arms 54 by way of piston rods 55 and clevices 56. The arms 54 are mounted on, and extend radially with respect to the central portions of, the tubes 22 and have forked outer or distal ends in straddled relation with the central portions of the spray pipes 29. The inner or proximal ends of the arms 54 extend loosely around the central portions of the tubes in order that the arms are free to swing or pivot relatively to the tubes. Fixed collars 57 on the central portions of the tubes serve to support the arms 54 against downward displacement with respect to the tubes. The piston rods 55 extend through, and are slidably mounted in, holes in the cylinder heads 48 and have the rear or inner ends thereof fixedly connected to the pistons 45. The outer or front ends of the piston rods are pivotally connected to the central portions of the arms 54 by the clevices 56. When the pistons are slid outwards, i. e., away from the cylinder crosswalls 47 they operate through the medium of the piston rods 55, the clevices 56, the arms 54, the spray pipes 33 and the upper and lower arms 18 and 19 to swing the brushes 11 forwards into their washing or operative position. Reverse sliding of the pistons in the cylinders results in the brushes being swung into their retracted position wherein they are out of contact with the adjacent car side and are disposed adjacent the supporting structure 10.

The air system 43 is associated with, and serves as the actuating medium for, the piston and cylinder devices 42 and forms with said devices the pneumatic means for swinging the brushes 11 back and forth between their inoperative and washing positions and includes an air supply pipe 58 and a single control valve 59. The air supply pipe 58 has one end thereof connected to a source of air under pressure, such, for example, as a storage tank or a compressor. The control valve 59 is of the 2-position type or variety and comprises a cylindrical casing 60 and a plug 61. The casing 60 of the control valve embodies four ports 62, 63, 64 and 65. These ports are disposed at right angles to one another and are arranged so that the port 62 is diametrically opposite the port 65 and the port 63 is diametrically opposite the port 64. The port 62, as shown in Figure 9a, is connected to the discharge end of the air supply pipe 58. The port 63 is connected to the inner or rear ends of the cylinders 44 of the piston and cylinder devices 42 by way of a pipe 66 and flexible branch pipes 67. The latter pipes extend and effect communication between the pipe 66 and the rear ends of the cylinders 44. The port 64 in the valve casing 60 is connected to the front or outer ends of the cylinders 44 by way of a pipe 68 and flexible branch pipes 69. The branch pipes 69, as shown in Figure 9, extend and effect communication between the pipe 68 and the front ends of the cylinders 44. The port 65 in the valve casing 60 is open to atmosphere. The plug 61 of the control valve 59 is rotatably mounted in the casing 60 and has a control handle 70 whereby it may be turned back and forth throughout an arc of 90°. As shown in Figure 9a the plug 61 embodies a pair of arcuate ducts 71 and 72. These ducts are positioned one opposite the other and are so arranged that when the plug is in one position the duct 71 connects, and establishes communication between, the ports 62 and 63 and the duct 72 connects, and establishes communication between, the ports 64 and 65 and when the plug is rotated 90° to its second position the duct 72 establishes communication between the ports 62 and 64 and the duct 71 establishes communication between the ports 63 and 65. When the plug is in the position shown in Figure 9a wherein the duct 71 connects the ports 62 and 63 and the duct 72 connects the ports 64 and 65 air under pressure is introduced into the rear ends of the cylinders 44 via the pipe 66 and the branch pipes 67 and causes the pistons to slide forwards and shift the brushes into their washing or operative position, and the front ends of the cylinders are vented via the branch pipes 69, the pipe 68, the port 64, the duct 72 and the port 65. When the plug 61 of the control valve is rotated 90° into its second position wherein the duct 72 connects the ports 62 and 64 and the duct 71 connects the ports 63 and 65 air under pressure is introduced into the front ends of the cylinders via the pipe 68 and the branch pipes 69 and causes the pistons to slide rearwards and effect retraction of the brushes, and the rear ends of the cylinders are vented via the branch pipes 67, the pipe 66, the port 63, the duct 71 and the vent port 65. When the control valve is manipulated so as to effect pneumatic shift of the brushes into their washing position the air in the cylinders between the pistons 45 and the cylinder crosswalls 47 forms a cushion or resilient medium which serves rapidly to return the brushes to the adjacent car side in the event that they are swung rearwards as a result of being contacted by grab irons or other projections on the side of the car being washed. A pressure regulator 73 is included in the air supply pipe 59 of the air system 43 in order that the pressure of the air that is delivered to the cylinders may be varied. By adjusting the regulator 73 the pressure of the air which is utilized to swing the brushes into their operating position may be varied to cause the brushes to engage the adjacent car side with any desired degree of pressure. The piston and cylinder devices 42 and the air system 43 with its single control valve 59 constitute pneumatic means for conjointly swinging the brushes into and out of their washing or operative position.

In order automatically to retract the brushes 11 in the event of failure of air under pressure while the plug of the control valve is in its second position wherein the duct 72 connects the ports 62 and 64 and the duct 71 connects the ports 63 and 65, counterweights 74 are provided. Preferably the counterweights are cylindrical so far as contour is concerned and there are two in associated relation with each brush. As shown in the drawings the counterweights are positioned slightly to the left of the central portions of the spray pipes 29 and are operatively connected to the horizontally extending arms 54 by way of bell cranks 75 and links 76. The bell cranks 75 embody forwardly extending arms 77 and downwardly extending arms 78 and are positioned directly in front of the brackets 50. They carry the counterweights 74 at the front or outer ends of their arms 77 and are supported for vertical pivotal movement by way of horizontal pivot pins 79. Such pivot pins extend through holes in the central portions of the bell cranks and have the ends thereof fixedly secured within holes in the front ends of horizontally extending pivot lugs 80. The inner or rear ends of the pivot lugs are welded or otherwise secured to the brackets 50. The pairs of counterweights are positioned in straddled relation with the front ends of the bell crank arm 77 and are connected thereto by horizontally extending bolts 81. The bell cranks extend transversely of the supporting structure 10. The links 76 underlie, and are in parallel relation with, the bell cranks and have the rear ends thereof pivotally connected to the lower ends of the bell crank arm 78 by clevices 82. The front ends of the links 76 are pivotally connected to the outer or distal ends of the arms 54 by clevices 83. When the brushes 11 are swung outwards into their washing position the links 76 move forwards and cause the bell cranks together with the counterweights to swing upwards as shown in dotted lines in Figure 7. In the event that there is a failure of air under pressure to the cylinders of the piston and cylinder devices in connection with retraction of the brushes the counterweights and bell cranks swing downwards and operate through the medium of the links 76, the arms 54, the spray pipes 29 and the upper and lower arms 18 and 19 automatically to retract the brushes. The retractile force which is imparted to the brushes by the counterweights is, of course, less than the force of the air under pressure whereby the brushes are swung into their washing position. It is, however, sufficient to effect automatic retraction of the brushes in the event of failure or inoperativeness of the air system 43.

For the purpose of limiting forward and rearward swinging of the brushes in connection with shift of the latter into and out of their washing position stop rods 84 are provided. These rods are three in number and are associated with the bell cranks 77, respectively. As shown in Figure 7 the stop rods extend horizontally and are positioned at right angles to the supporting structure 10. The rear ends of the stop rods extend slidably through holes 85 in the brackets 50 and the front ends of the rods are pivotally connected to the central portions of the bell crank arms 78 by clevices 86. Sliding movement of the rods 84 relatively to the brackets 50 is limited or restricted by rubber washers 87 and 88. The washers 87 are mounted on the rear extremities of the stop rods 84 and such extremities are provided with male screw threads 89 and carry nuts 90 on the screw threads. Said nuts 90 abut against the rear ends of the washers 87 and are adapted in response to turning thereof axially to adjust the washers 88 relatively to the stop rods 84. Lock nuts 91 are also mounted on the male screw threads 89 and serve when tightened into abutment with the nuts 90 to lock the latter in place. When the brushes 11 are swung forward in response to actuation of the piston and cylinder devices 42 the stop rods 84 slide forwards until the rubber washers 87 are brought into engagement or abutment with the rear faces of the brackets 50. As soon as the washers 87 are in abutment with the rear faces of the brackets 50 forward swinging of the brushes is stopped. By axially adjusting the washers 88 with respect to the stop rods the degree of forward swinging of the brushes may be controlled. It is contemplated that the washers will be so adjusted that in connection with forward swinging of the brushes the brushes will be stopped or brought to rest in such a washing position that the bristles thereof so contact the adjacent car side that best washing results are obtained. By employing the washers 87 on the stop rods the brushes are precluded from swinging so far forwards after a car washing operation that they bounce when contacted by the forward end of the car following the washed car. The stop rods 84 and washers 87 constitute simple means for adjustably limiting forward swinging of the brushes 11. The rubber washers 88 are mounted on the central portions of the stop rods 84 and are adapted in connection with retraction of the brushes to their inoperative position to abut against the front faces of the brackets 50. Said central portions of the stop rods are provided with male screw threads 92 as shown in Figures 7 and 8. Nuts 93 are mounted on the screw threads 92 and abut against the front ends of the washers 88. By rotating the nuts 93 in one direction or the other the washers 88 may be axially adjusted with respect to the central portions of the stop rods in order to control the degree or extent of rearward movement or swinging of the brushes during retraction of the latter. Lock nuts 94 are also mounted on the screw threads 92 and serve to lock the nuts 93 in their various adjusted positions. When the piston and cylinder devices 42 are actuated so as to swing the brushes rearwards the rods 84 slide rearwards until the rubber washers 88 are brought into abutment with the front faces of the brackets 50. As soon as the washers 88 are brought into abutment with the brackets the brushes 11 are brought to rest in their retracted position. The washers 88 together with the nuts 99 constitute means for adjustably limiting rearward swing of the brushes, i. e., retraction of the brushes.

The operation of the car washing apparatus is as follows:

When it is desired to use the apparatus the piston and cylinder devices 42 are actuated by proper manipulation of the control valve 59 to swing the brushes 11 forwards into their washing position. As soon as the brushes are in such position the electric motors 36 are energized so as to rotate the brushes, and the water or chemical washing solution is supplied to the spray pipes 29 via the pipe 34. In connection with a car washing operation the car to be washed is propelled past the apparatus with the result that the brushes 11 serve to wash by a brushing action the adjacent car side including the various windows. At the conclusion of a car washing operation the piston and cylinder devices 42 are actuated by proper manipulation of the valve 59 to swing the brushes inwards to their retracted position. As soon as the brushes are retracted the supply of current to the motors 36 is cut off and the feed of water or chemical solution under pressure to the spray pipes is stopped. If in connection with retraction of the brushes the supply of air under pressure to the piston and cylinder devices 42 should fail the counterweights 74 will, as previously pointed out, operate automatically to swing the brushes into their full retracted position.

The herein described car washing apparatus effectively and efficiently fulfills its intended purpose and may be operated with facility. Because of the construction, design and arrangement of its various parts the apparatus may be produced and operated at a low cost.

Whereas the apparatus has been described as comprising three rotary brushes and as being primarily adapted for use in washing railroad cars it is to be understood that the apparatus may be made with a single brush or with more or less than three brushes and that it is capable of washing other types of vehicles. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. An apparatus adapted to wash a vehicle as the latter moves past it and comprising an upstanding supporting structure adjacent the path of movement of the vehicle, an elongated power driven brush pivotally supported on the structure so that it is capable of being swung bodily back and forth between a washing position wherein it engages the adjacent portion of the vehicle and an inoperative position wherein it is out of engagement with said adjacent portion of the vehicle, valve controlled pneumatic means for swinging the brush into its washing position and yieldingly holding said brush in such position, and means independent of, and of less force than, the pneumatic means for constantly urging the brush into its said inoperative position with sufficient force to cause the brush automatically to swing into such position in the event of failure or inoperativeness of said pneumatic means.

2. An apparatus adapted to wash a vehicle as the latter moves past it and comprising an upstanding supporting structure adjacent the path of movement of the vehicle, an elongated rotary power driven brush, a frame type mounting for the brush supported on the structure so that it is shiftable back and forth between an operative position wherein the brush is in engagement with the adjacent portion of the vehicle and an inoperative position wherein the brush is out of engagement with said adjacent portion of the vehicle, valve controlled pneumatic means adapted to shift the mounting into its operative position and yieldingly to hold said mounting in such position and embodying coacting piston and cylinder elements one of which is connected directly to the supporting structure and the other of which is slidable relatively to the one and is so connected to the mounting that the latter is caused positively to move with it, and gravity actuated means for urging the mounting into its inoperative position said last mentioned means having less force than the pneumatic means but sufficient force to cause the mounting to be shifted automatically into its said inoperative position in the event of failure or inoperativeness of the pneumatic means.

3. An apparatus adapted to wash a vehicle as the latter moves past it and comprising an upstanding supporting structure adjacent the path of movement of the vehicle, an elongated rotary power driven brush, a vertically elongated mounting for the brush pivotally connected to the structure so that it is capable of being swung laterally back and forth between a washing position wherein the brush is in engagement with the adjacent portion of the vehicle and an inoperative position wherein the brush is out of engagement with said adjacent portion of the vehicle, valve controlled pneumatic means adapted to swing the mounting into its washing position and embodying coacting piston and cylinder elements one of which is pivotally connected to the supporting structure and the other of which is pivotally connected to the mounting, and means between said supporting structure and mounting for constantly urging the mounting into its inoperative position, the last mentioned means having less force than the pneumatic means but sufficient force to cause the mounting automatically to swing into its said inoperative position in the event of failure or inoperativeness of said pneumatic means.

4. An apparatus adapted to wash a vehicle as the latter moves by it and comprising an upstanding supporting structure at one side of the path of movement of the vehicle, an elongated rotary power driven brush, a frame type mounting for the brush supported on the structure so that it is shiftable laterally back and forth between a position wherein the brush is in engagement with the adjacent portion of the vehicle and a position wherein the brush is out of engagement with said adjacent portion of the vehicle, valve controlled pneumatic means in the form of coacting piston and cylinder elements between the supporting structure and the mounting for shifting and mounting into its first mentioned position and yieldingly holding said mounting in such position, and gravity actuated means operative constantly to urge the mounting into its second mentioned position and embodying a bell crank connected to the supporting structure to swing vertically, a counterweight on the outer end of one of the arms of the bell crank and a link having one end thereof pivotally connected to the outer end of the other arm of the bell crank and its other end pivotally connected to the mounting, said gravity actuated means having less force than the pneumatic means but sufficient force to cause the mounting automatically to be shifted in its said second mentioned position in the event of failure or inoperativeness of said pneumatic means.

5. An apparatus adapted to wash a vehicle as the latter moves by it and comprising an upstanding supporting structure at one side of the path of movement of the vehicle, a vertically elongated rotary power driven brush, a vertically elongated frame type mounting for the brush pivotally connected to the supporting structure so that it is capable of being swung laterally back and forth between a washing position wherein the brush is in engagement with the adjacent side of the vehicle and an inoperative position wherein the brush is out of engagement with the adjacent vehicle side, and provided with a radially extending arm, valve controlled pneumatic means adapted to shift the mounting into its first mentioned position and yieldingly to hold said mounting in such position and embodying coacting piston and cylinder elements one of which is pivotally connected to the aforesaid supporting structure and the other of which is pivotally connected to the arm, and gravity actuated means operative constantly to urge the mounting into its second mentioned position and embodying a bell crank connected to the supporting structure to swing vertically, a counterweight on the outer end of one of the arms of the bell crank and a link having one end thereof pivotally connected to the outer end of the other arm of the bell crank and its other end pivotally connected to said radially extending arm, said gravity actuating means having less force than the pneumatic means but sufficient force to cause the mounting automatically to swing into said second mentioned position in the event of failure or inoperativeness of said pneumatic means.

6. An apparatus adapted to wash a vehicle as the latter moves past it and comprising an upstanding supporting structure at one side of the path of movement of the vehicle, a vertically elongated rotary power driven brush, a vertically elongated frame type mounting for the brush pivotally connected to the structure so as to swing laterally toward and away from the vehicle, and provided with a radially extending arm, valve controlled pneumatic means adapted to swing the mounting towards and away from the vehicle and embodying coacting piston and cylinder elements, one of which is pivotally connected to the supporting structure and the other of which is pivotally connected to the aforesaid arm, gravity actuated means operative constantly to urge the mounting away from the vehicle, embodying a bell crank connected to the supporting structure to swing vertically, a counterweight on the outer end of one arm of the bell crank and, a link having one end thereof pivotally connected to the outer end of the other arm of the bell crank and its other end pivotally connected to said radially extending arm, and having the force thereof less than the force of the pneumatic means but sufficient to cause the mounting automatically to swing away from the vehicle in the event of failure or inoperativeness of said pneumatic means, and adjustable means adapted to limit swinging movement of the mounting towards and away from the vehicle and comprising a rod having one end thereof in sliding engagement with the supporting structure provided with spaced apart stop nuts and having its other end pivotally connected to said other arm of the bell crank.

7. An apparatus adapted to wash a vehicle as the latter moves by it and comprising a supporting structure adjacent the path of movement of the vehicle, an elongated rotary power driven bristle type brush, a mounting for the brush supported on the structure so that it together with the brush is shiftable laterally towards and away from the vehicle to be washed, adjustable stop means between the supporting structure and the mounting for limiting shift of said mounting towards the vehicle, valve controlled pneumatic means for shifting the brush mounting towards the vehicle into the position determined by said stop means and yieldingly holding the mounting in said position, and means between the supporting structure and mounting for constantly urging the frame away from the vehicle, said last mentioned means being independent of, and having less force than, the pneumatic means but having sufficient force to cause the mounting automatically to swing away from the vehicle in the event of failure or inoperativeness of said pneumatic means.

LOUIS D. HOLMES.

REFERENCES CITED

The following references are of record in the file of this patent:

UNITED STATES PATENTS

| Number | Name | Date |
| --- | --- | --- |
| 1,697,879 | Olson | Jan. 8, 1929 |
| 1,740,546 | Leschke | Dec. 24, 1929 |
| 1,827,887 | Gillespie | Oct. 20, 1931 |
| 2,025,780 | Rosebrook | Dec. 31, 1935 |
| 2,215,692 | Fleming | Sept. 24, 1940 |
| 2,242,692 | Yingling | May 20, 1941 |